United States Patent [19]

Hart et al.

[11] 4,369,346
[45] Jan. 18, 1983

[54] MICROWAVE BAKING UTENSIL

[75] Inventors: Bill J. Hart; Billy E. Smith, both of Bloomington; Maverine H. Short, LeRoy, all of Ill.

[73] Assignee: National Union Electric Corporation, Greenwich, Conn.

[21] Appl. No.: 50,479

[22] Filed: Jun. 20, 1979

[51] Int. Cl.$^3$ ............................................. H05B 9/06
[52] U.S. Cl. ..................... 219/10.55 E; 219/10.55 F; 426/243
[58] Field of Search .................. 219/10.55 E, 10.55 F, 219/10.55 R, 10.55 M; 426/107, 109, 243; 425/174, 174.4, 174.6, 174.8

[56] References Cited

U.S. PATENT DOCUMENTS

| | | | |
|---|---|---|---|
| 3,662,700 | 8/1972 | Glyptis | 428/427 |
| 3,783,220 | 1/1974 | Tanizaki | 219/10.55 E |
| 3,853,612 | 12/1974 | Spanoudis | 219/10.55 E |
| 3,965,323 | 6/1976 | Forker, Jr. et al. | 219/10.55 E |

Primary Examiner—A. T. Grimley
Attorney, Agent, or Firm—Alfred E. Miller

[57] ABSTRACT

A microwave baking utensil comprises a unitary body of a porous ceramic material having a cooking surface on its upper side, and pattern of a compound of a Group III, IV or V material ion implanted in its lower support surface. The ion implanted material has an n-type impurity, and a p-type impurity therein.

8 Claims, 8 Drawing Figures

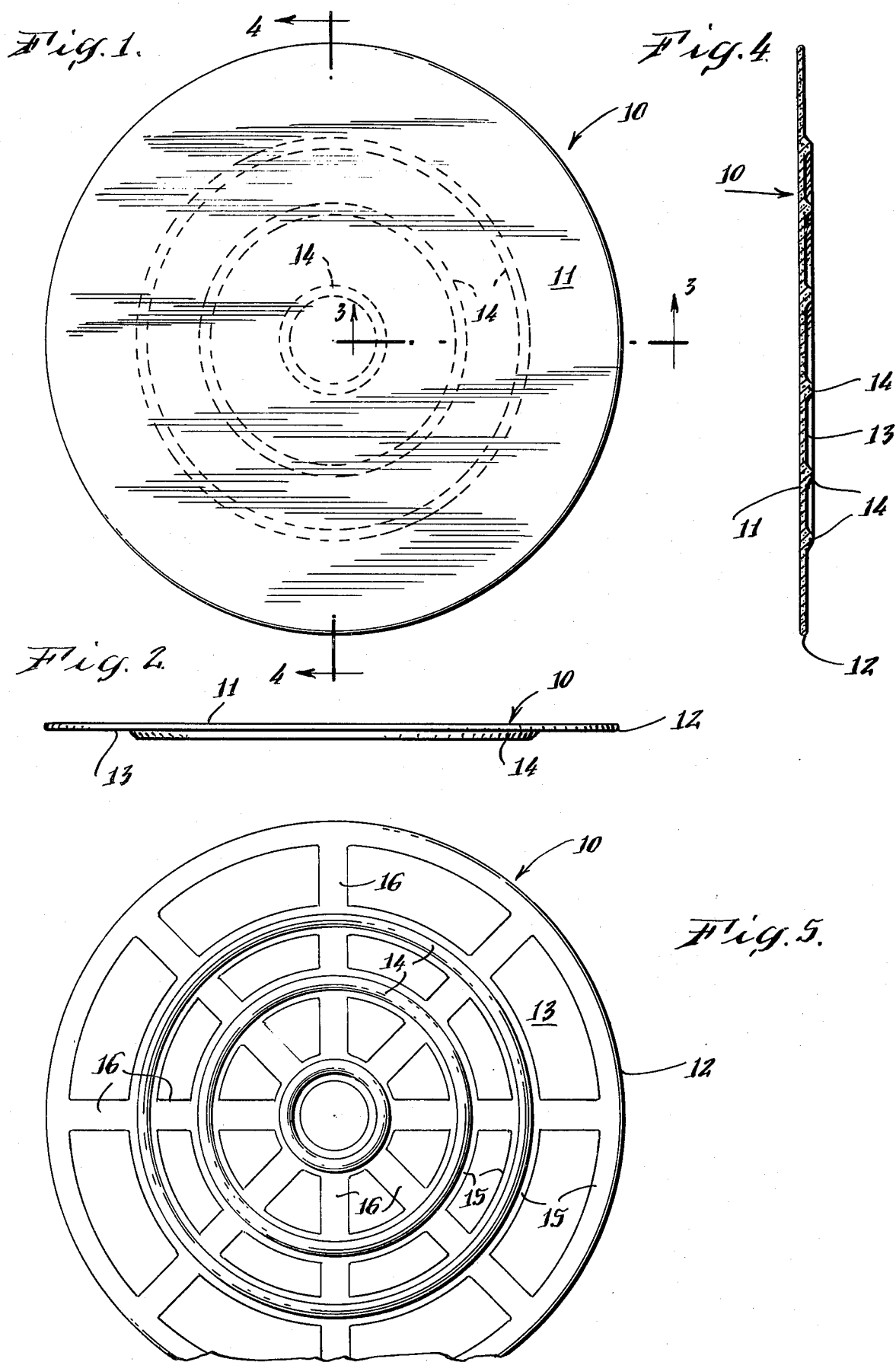

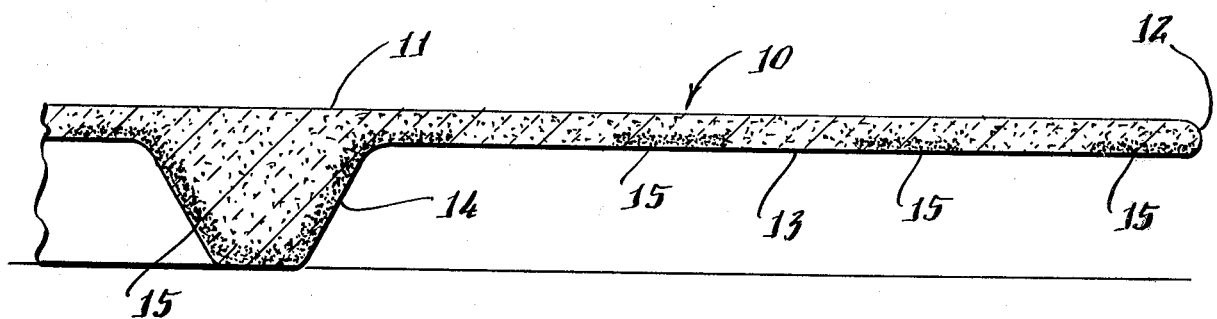
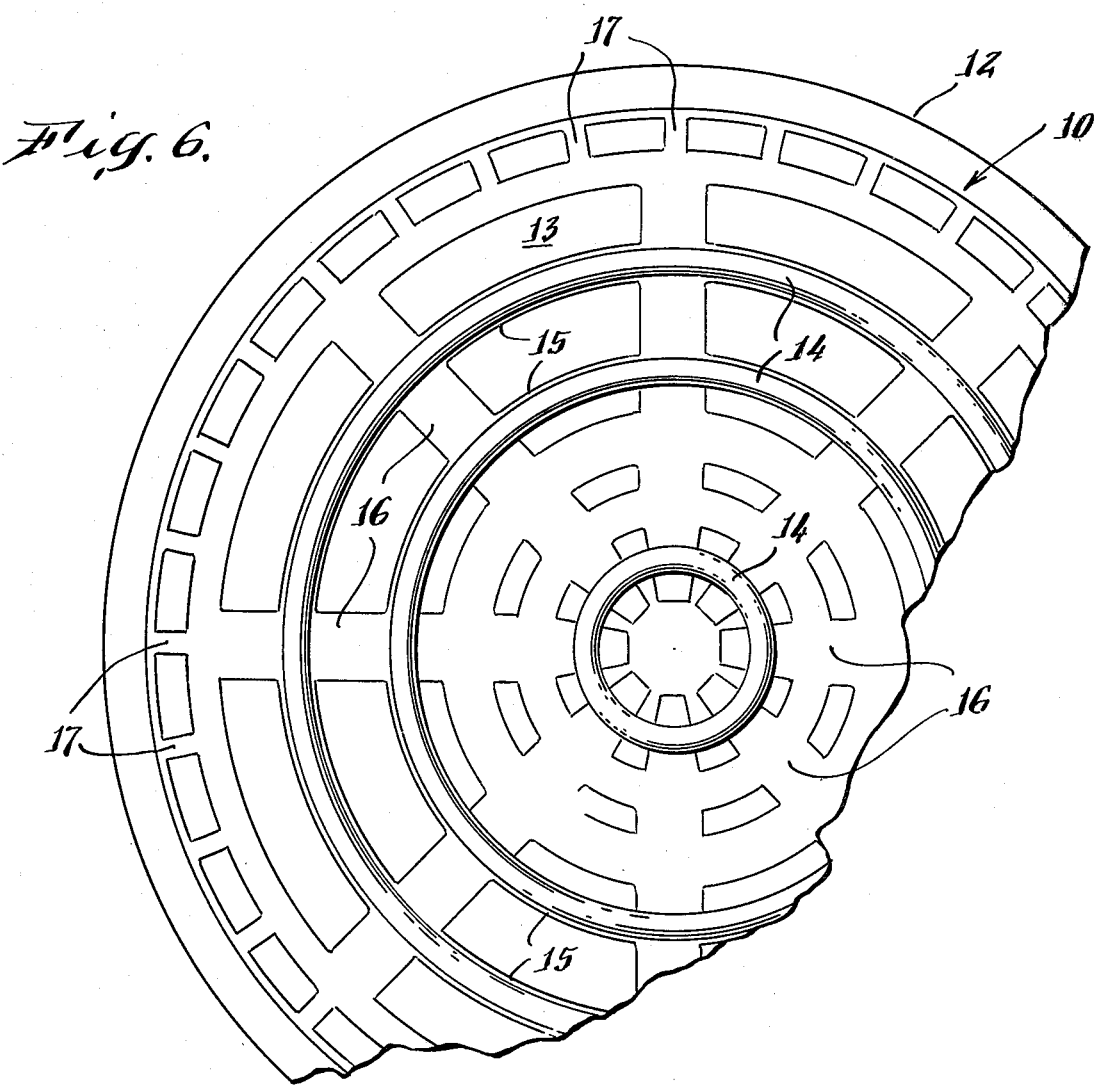

MICROWAVE BAKING UTENSIL

This invention relates to microwave cookware, and is more in particular directed to a utensil, useful in a microwave oven, for converting microwave energy to heat energy.

U.S. Pat. No. 3,682,700, Glyptis discloses a technique for imparting electrical conductivity to an amorphous solid in a surface zone thereof, wherein a carrier solid is ion implanted in an amorphous normally non-conducting thermally plasticizable substrate, the composition being of an element of a Group III, IV or V material, and including an n-type impurity that can exist in a valence state higher than that of the carrier element, and a p-type impurity of an element that can exist in a valence state lower than that of the carrier element. The disclosure of this patent indicates that the resultant product is useful as an electric heater, by the passage of a current through the ion implanted material.

U.S. patent application Ser. No. 941,656, filed Sept. 11, 1978, of Quentin R. Krantz, discloses that a product formed by the techniques of U.S. Pat. No. 3,682,700, is particularly useful as a microwave cooking utensil, since the ion implanted material in fact also serves to convert microwave energy to heat energy, and since the heat generating material is formed within the molecules of the surface of the cookware, instead of constituting a surface layer as in some proposed microwave cookware.

While the utensil of the above U.S. patent application Ser. No. 941,656 is suitable for general cooking applications, employing microwaves, it is not equally effective in the cooking of all food products, it being noticeably difficult to satisfactorily bake dough or the like on cookware of this type.

U.S. Pat. No. 3,853,612, Spanoudis discloses the coating of a glass-ceramic with a pattern of tin oxide, to serve as a browning dish in a microwave oven. The pattern has been selected in this reference so that only the desired areas of the cookware will be heated for browning purposes. In this reference, the glass-ceramic utensil is defined as constituting a semi-crystalline ceramic body having a crystalline phase randomly dispersed in a residual glassy phase or matrix. While the cookware of Spanoudis is indicated to be satisfactory for some purposes, the present applicant has found that materials of the type of which the body of the cookware of this reference is made are not generally suitable in the baking of dough.

U.S. Pat. No. 4,039,797 discloses a utensil for baking bakery products in a microwave environment, wherein the undesirable doughy or unbaked state at the bottoms of the baked products is avoided by providing openings in the bottom of the cooking utensil. Thus, for example, this reference discloses the baking of cupcakes in tapered open bottom receptacles of a glass material. It is apparent that this expedient will not be satisfactory for all shapes of baked products.

In view of the above state of the art, the present invention is directed to the provision of a microwave cooking utensil specifically adapted for baking purposes, wherein the disadvantages of known utensils is overcome.

Briefly stated, in accordance with the invention, a microwave cooking utensil, particularly adaptable for the baking of dough, is provided, comprising a unitary body of a porous ceramic material. The upper surface of the body is shaped to receive the dough to be cooked, and may, for example, be flat if the utensil is designed to cook a foodstuff such as pizza. The lower surface of the utensil is preferably provided with downwardly extending support ridges, so that a dish-shaped utensil may be provided, in the preferred form of the invention.

A composition or compound of a material of one of the Group III, IV or V elements is ion implanted in the undersurface of the utensil, in the form of a pattern, in order to enable the proper heating of the desired areas of the utensil while maintaining the desired heat. The ion implanted composition has an n-type impurity, as well as a p-type impurity therein. Since the utensil is employed for use in a microwave oven, it is preferable to avoid conductive interconnections to the ion implanted composition in the undersurface of the utensil.

In order that the invention will be more clearly understood, it will now be disclosed in greater detail with reference to the accompanying drawings, wherein:

FIG. 1 is a top view of one embodiment of a microwave cooking utensil in accordance with the invention;

FIG. 2 is a side view of the utensil of FIG. 1;

FIG. 3 is an enlarged cross-sectional view of a portion of the utensil of FIG. 1, taken along the lines 3—3;

FIG. 4 is a diametric cross-sectional view of the utensil of FIG. 1 taken along the lines 4—4;

FIG. 5 is a partial bottom view of the embodiment of a microwave heating utensil constructed in accordance with the invention;

FIG. 6 is an enlarged partial bottom view of still another embodiment of a heating utensil in accordance with the invention;

Figure 7:
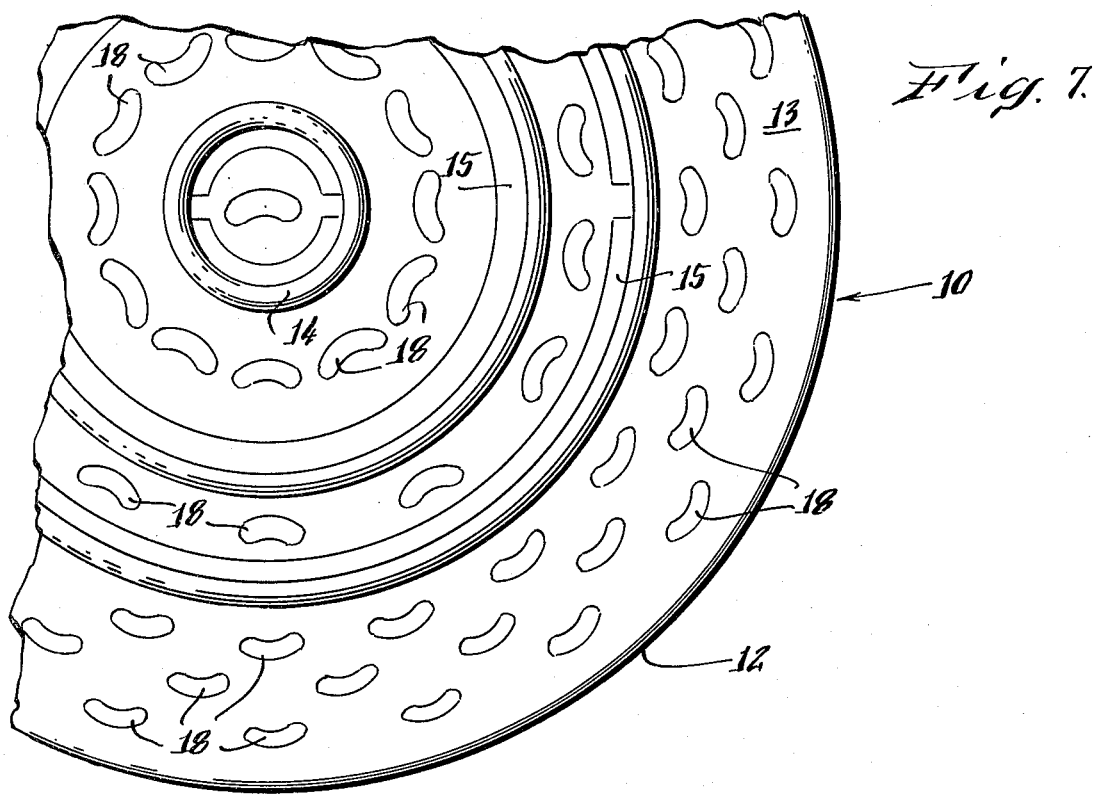
FIG. 7 is a partial enlarged bottom view of a still further embodiment of the invention.

Referring now to the drawings, and more in particular to FIGS. 1 through 4, therein is illustrated one embodiment of a microwave cooking utensil in accordance with the invention. The structure of the utensil is simple in form, and is comprised of a unitary body 10 of a porous ceramic material. The body 10 has an upper surface 11 adapted to receive food, such as dough or the like to be baked. In the illustrated embodiment of the invention, which is particularly adaptable for the cooking of pizza or the like, the utensil is substantially round of a suitable diameter for this purpose, with the upper surface being substantially flat throughout its extent. If desired, the edges 12 of the utensil may be slightly upturned, although for the preparation of pizza this is not necessary. It will of course be evident that in other embodiments of the invention the utensil may be deeper. The lower surface 13 of the utensil is preferably provided with downwardly extending support ridges 14. In the embodiment of the invention illustrated in FIGS. 1-4, for example, the ridges are in the form of concentric circles, although this configuration is not necessary to the present invention.

In accordance with the invention, the utensil is further provided with a pattern 15 of an ion implanted compound in its lower surface. In the illustrated embodiment of the invention, this ion implanted pattern is also in the form of a plurality of concentric circles, the innermost of which may conform to the ridges 14. This latter feature is also not of importance, as will be shown in the following paragraphs.

The ion implanted composition is formed, and is of materials in conformity with the above discussed U.S. Pat. No. 3,682,700, with the exception of the substrate material. Thus, in accordance with the present invention, the substrate is of a porous material, such as Cordierite, whereas in the structure of U.S. Pat. No. 3,682,700 the substrate is an amorphous material. In each case, however, the substrate is normally non-conducting, solid, and thermally plasticizable.

The ion implanted material forming the patterns 15 penetrate the molecules of the underside of the utensil, as depicted more clearly in the enlarged cross-sectional view of FIG. 3. This material is a compound of a material selected from the group of materials including Groups III, IV and V of the periodic table. The selected element includes therein an n-type impurity inorganic compound of an element that can exist in a valence state higher than that of the carrier element, and a p-type impurity inorganic compound of an element that can exist in a valence state lower than that of the carrier element. The criteria for such compositions is explained in greater detail in the above-mentioned U.S. Pat. No. 3,682,700, and a number of materials of this type, suitable for use in the present utensil are also disclosed in this reference. For example, it has been found that a suitable material in accordance with the present invention for the carrier, is Stannous Chloride ($SnCl_2.2H_2O$), with the n-type impurity being Vanadium Pentoxide ($V_2O_5$), Phosphotungstic Acid, Chromium Chloride ($CrCl_3.6H_2O$) and the p-type impurity being Boric Acid ($H_3BO_3$).

In accordance with the invention, the area of the pattern, and its configuration, are selected in order to provide the required temperature and distribution of heat for the foodstuff to be cooked or baked. Thus, as is usual in the use of browning dishes in microwave ovens, the utensil in accordance with the invention is adapted to be preheated, i.e., inserted in the microwave field for a given time in order to attain a desired temperature. For example, for the cooking of pizzas, it is therefore desired to attain a temperature of from about 325° F. to 375° F. The pattern or design should be configured so that this temperature is attained in about 6 to 7½ minutes in a conventional home microwave oven, in order to allow for variations in cooking power. For this purpose, it is also preferred that the ion implanted material or layer have a resistivity of about 100–900 ohms/cm$^2$ and penetrate the molecules of the undersurface of the utensil about 0.1 microns to 5 microns. With such a design, the designed inefficiency of the pattern of the ion implanted material does not allow much higher temperatures to be attained than those desired, without excessive preheating times. Again, due to the reduced efficiency of heating by the selection of the pattern, the conversion rate of microwave energy to heat the utensil becomes nearly equal after approximately 12 to 14 minutes.

The ion implanted layer is provided on the undersurface of the cooking utensil, in order to improve the distribution of heat throughout the foodstuff, as well as to avoid any direct contact between the ion implanted material and the foodstuff. In this latter regard, it is not felt that any special precaution is really necessary, since tests have shown repeated and vigorous scrubbing and cleansing result in no deterioration of the heating capabilities of the layer, so that contamination of the foodstuff could not be expected even if the ion implanted layer were in the upper surface of the utensil.

While the thickness of the utensil is not critical, in the illustrated embodiment of the invention a thickness of ⅛ inch was employed.

As has been stressed in the above disclosure, in accordance with the invention the utensil is of a porous material. It has been found that this is necessary for the baking of dough or the like, in order to avoid the uncooked, doughy consistency characteristic of microwave baked products in the past. Preferably, the material has a porosity of 8–12%. It is to be noted that the ion implanted layer in a lower surface of the utensil does not affect the porosity of the material.

In the fabrication of the article, in accordance with the invention, the method generally disclosed in U.S. Pat. No. 3,682,700 is employed. Specifically, the temperature of the preformed porous ceramic substrate is raised so that, in the areas to be treated, it is in a molecularly plastic condition. While the material is in this condition, a fluid composition containing inorganic electrically conducting particles of colloidal size and smaller of the Group III-V element is applied to the substrate, such that the particles penetrate the substrate between the molecules thereof and impart electrical conductivity to the substrate. This material, as above discussed, of course contains the p-type and n-type impurities. As a result, the conductivity is retained when the excitation of the substrate ceases. In the above example, employing cordierite as the substrate, the areas of the substrate to be treated were initially raised to a temperature of about 1,380° F., and this temperature was held for about thirty minutes in order to achieve the necessary resistivity.

As one further difference between the arrangement of U.S. Pat. No. 3,682,700, in the utensil of the invention conductive electrodes are preferably not provided contacting the ion implanted layer.

Referring now to FIG. 5, therein is illustrated the underside of a modification of the utensil of FIG. 1, wherein the pattern of ion implanted material includes the concentric rings 15 as in the embodiment of FIG. 1, as well as regularly distributed radially extending portions 16. In this arrangement the coverage of the bottom of the utensil by ion implanted material is greater than that of FIG. 1, and has a slightly higher temperature. In each example, the width of the ion implanted lines was about a ¼ to a ½ inch. In a still further embodiment, as illustrated in FIG. 6, the concentric rings 15 are provided, as well as wider radial extending elements 16 to the next to the last outer concentric ring 15, and narrower radial portions 17, more closely spaced to one another, are provided between the outer two concentric rings. This arrangement may be employed to provide somewhat more concentrated heat at the peripheral area, wherein the heat loss of the foodstuff may be greater.

In a still further embodiment, as illustrated in FIG. 7, the concentric rings 15 may be provided, with the area between these rings being provided with discrete separated areas 18 of any desired shape or size, but having the density and distribution necessary to provide the desired preheating temperature. It will of course be apparent that many other configurations of the pattern may be employed, without the concept of the invention.

Figure 8:
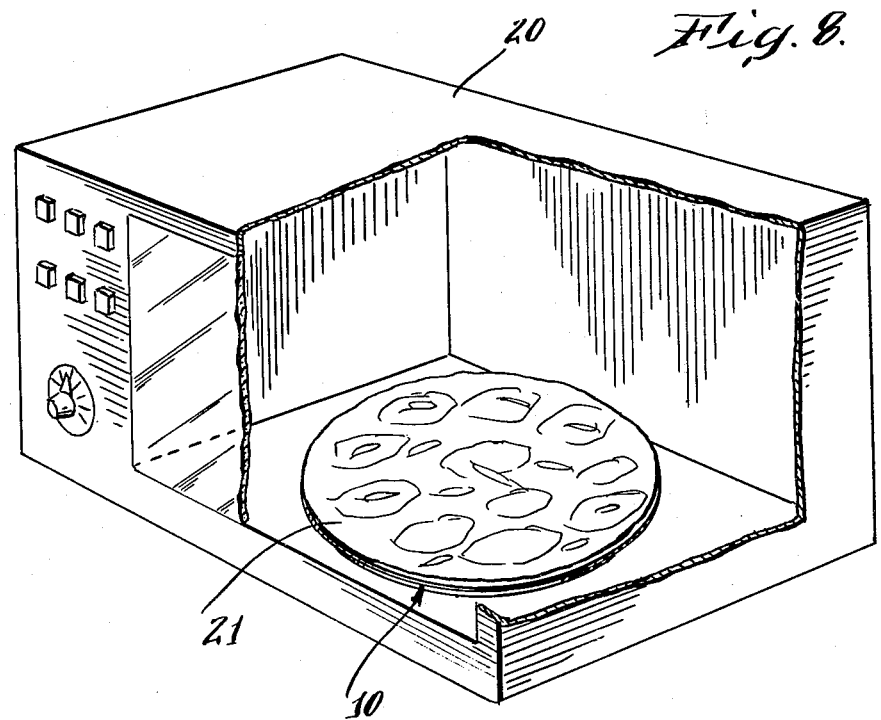
FIG. 8 is a broken away view of a conventional microwave oven showing the utensil of the invention disposed therein during use.

In the process of employing the utensil in accordance with the invention, the utensil is first inserted in a microwave oven, such as the oven 20 of FIG. 8, without the foodstuff therein. The oven is then turned on, preferably under full power, for a determined period, as discussed above, so that the microwave energy effects the heating of the utensil. Thereafter, the foodstuff, such as the uncooked pizza 21, is formed in the utensil, for cooking thereof in the oven.

While the invention has been disclosed with reference to a few embodiments thereof, it will be apparent that many modifications may be made therein, and it is intended in the following claims to cover each such variation and modification as falls within the true spirit and scope of the invention.

What is claimed is:

1. A utensil for microwave baking comprising a unitary body of a porous ceramic material having an upper cooking surface and an underside support surface, and an open pattern of a compound of an inorganic solid carrier and being ion implanted on said underside support surface, said carrier being a material selected from the group consisting of Groups III, IV and V of the periodic table, said material having an n-type impurity that can exist in a valence state higher than the carrier and a p-type impurity that can exist at a valence state lower than said carrier, said compound penetrating the molecules of said ceramic material at said underside surface.

2. The utensil of claim 1 wherein said upper cooking surface is flat substantially throughout its extent.

3. The utensil of claim 1 wherein the underside of said body is provided with raised support ridges.

4. The utensil of claim 1 wherein said pattern has a plurality of concentric circles.

5. The utensil of claim 4 wherein said concentric circles are joined by radially extending sections of said ion implanted compound.

6. The utensil of claim 1 wherein said pattern is comprised of a plurality of separate and discrete areas.

7. The utensil of claim 1 wherein said pattern is free of external conductive connections.

8. The utensil of claim 1 wherein said pattern has a thickness of from about 0.1 to 5 microns.

* * * * *